O. B. REYNOLDS.
END GATE.
APPLICATION FILED MAR. 7, 1908.
935,819.
Patented Oct. 5, 1909.
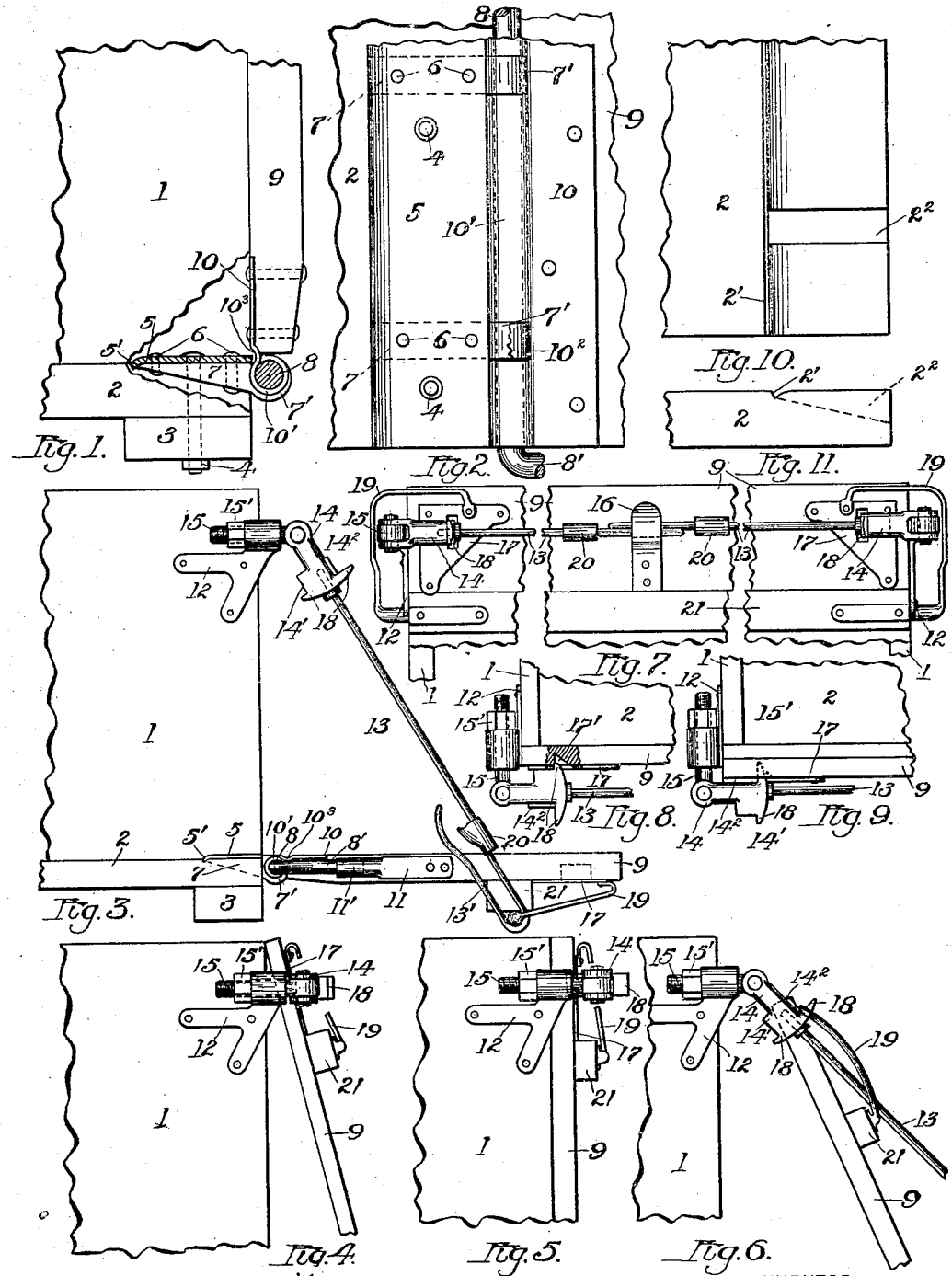
WITNESSES:
F. W. Hoffmeister
Minnie U. Hoffmeister
INVENTOR
Oliver B. Reynolds
BY
J. C. Warnes
ATTORNEY

UNITED STATES PATENT OFFICE.

OLIVER B. REYNOLDS, OF ELGIN, ILLINOIS.

END-GATE.

935,819.

Specification of Letters Patent.

Patented Oct. 5, 1909.

Application filed March 7, 1908. Serial No. 419,622.

*To all whom it may concern:*

Be it known that I, OLIVER B. REYNOLDS, a citizen of the United States, residing at Elgin, in the county of Kane and State of Illinois, have invented a new and useful Improvement in End-Gates, of which the following is a complete specification.

This invention relates to end-gates for wagon bodies, and is more particularly designed to be used in connection with dumping wagons.

The object in view is to produce an end gate which will be simple in design, durable in construction and convenient in use.

The construction herein disclosed is characterized by the following features: It forms a close and uninterrupted connection with the floor of the wagon body, and hence is well adapted for use as a scoop board; it can be swung on its lower hinge bearing either partly or completely open; it can be swung about its hinge bearing either above or below to any degree, thus adapting it to dump either fine or coarse material; and it can be locked either moderately or absolutely tight to the wagon body.

Other subordinate improvements will be hereinafter described, pointed out in the claims and illustrated in the accompanying drawings, in which—

Figure 1 represents a side elevation, partly in section, of the rear and lower corner of a wagon body. Fig. 2 is a fragmentary plan, showing the floor plate and hinge plate when the end-gate and hinge plate thereon are open. Fig. 3 shows a side elevation of the rear end of the wagon body with the end-gate down. Figs. 4, 5 and 6 are detail views in elevation of the rear and upper portion of the wagon body and end-gate in its various relations with respect thereto; Fig. 4 showing the end-gate loosened at its lower side and pivoting on an axis near its upper side; Fig. 5 showing the end-gate closed; and in Fig. 6 the end-gate is shown loosened at its lower edge and pivoting on an axis formed by the pivotal connection of the clamp rods with the wagon body. Fig. 7 represents a broken rear elevation of the end-gate. Figs. 8 and 9 are fragmentary plan views of the left-hand rear corner of the wagon body, designed to show the reversible clamp blocks in their two different positions; and Figs. 10 and 11 represent, respectively, a fragmentary plan and elevation of the rear end of the floor of the wagon body, showing the manner in which it is recessed to receive the lugs and floor plate.

In the drawings 1 designates the sides of the wagon body, 2 the floor of same and 3 a cleat extending transversely of the bottom and on the under side thereof, the cleat being secured to the bottom by means of the bolts 4. On the upper side of the rear end of the body floor is secured the floor plate 5, the forward edge thereof being inclined downwardly, a triangular recess or kerf $2^1$ (see Figs. 10 and 11) formed in surface of said floor 2 receiving the downwardly inclined edge $5^1$ of the floor plate 5. This construction in effect makes a smooth and continuous surface between the floor and floor plate and presents no obstructing ledge to bodies moving over same, and yet requires practically no mortising in the floor for the plate. Secured to the under side of the plate 5, by the rivets 6, or other suitable means, are the lugs 7, the mortises $2^2$ in the floor receiving said lugs. These lugs project rearwardly from the rear end of the wagon body floor and have formed in their ends apertures or eyes $7^1$ which engage the transversely extending shaft 8, this shaft constituting the lower and principal pivotal axis of the end-gate 9.

The end-gate 9 has secured to its lower edge the hinge plate 10, the lower end thereof being bent to a circular shape to form an eye $10^1$ which engages the said shaft 8, the notches $10^2$ being cut in the eye portion $10^1$ of the hinge plate to receive the eyes $7^1$ of the lugs 7. In order to secure a close fit between the rear edge of the floor plate 5 and the hinge plate 10 when the end-gate is in either its open or closed position, the hinge plate is provided with a slight longitudinal depression $10^3$ adjacent to the eye portion thereof, the arrangement being such that said depression $10^3$ will receive the rearward edge of the floor plate when the end-gate is closed. To hold the transversely extending shaft 8 in position and to render it readily removable, it is provided with a bent or deflected end $8^1$ which normally lies along the end of the end-gate 9, the spring clip 11, with the inwardly concave free end $11^1$ thereon engaging the bent end and securing the shaft against movement.

To control the upper end of the end-gate in its open or closed positions, the following means are employed: A bearing bracket 12 is secured to the rear ends of the side boards 1 of the wagon body and near the upper corner thereof, these bracket bearings forming a pivotal support for the clamp rods 13. The clamp rods 13 connect with the bearings 12 through the clamp block 14 and eye bolts 15, these last mentioned elements in effect forming a part of said rods and a combined hinge and swivel bearing between them and the wagon body. The free ends of the clamp rods 13 terminate in the hooks $13^1$, and the clip 16, secured to rear of the end-gate, enables both of the rods to be detachably engaged with the end-gate, such engagement locking same in its closed position. The clamp block 14 is provided with the abutting surfaces $14^1$ and $14^2$ at greater or less distances, respectively, from the longitudinal axis of the clamp rod 13. When the surface $14^1$ abuts the end-gate 9, as shown in Fig. 8, the end-gate will be locked tightly against the wagon body; but when the surface $14^2$ abuts, the end-gate will be held loosely in place, as illustrated in Fig. 9. The first mentioned method of locking is used when hauling fine material, and the last mentioned method when the end-gate is opened as shown in Fig. 4. A wearing plate 17 is preferably interposed between the abutting surfaces $14^1$ and $14^2$ and the end-gate 9. At the outer end of the clamp blocks, and integral therewith, are formed the shoulders 18, the function of which is to engage a corresponding recess $17^1$ in the wearing plate 17 and end-gate 9 and thus prevent possible outward spreading of the side boards 1. A further function of these shoulders is to form a pivotal axis about their points on which the end-gate swings when the shaft 8 is withdrawn and before the clamp rods 13 are released, the extent of such movement being shown in Fig. 4; i. e., the extent of such movement being that between normal and the position shown in said figure. The extent of opening last indicated is desirable in unloading small grain, etc.

A guide bracket 19 is secured to the ends of the upper corners of the end-gate, serving to guide the clamp rods 13 when released, turning them in such a manner as to insure their engagement by said brackets when the end-gate is folded down, as shown in Fig. 3. If it is desired to swing the end-gate farther open from below when the shaft 8 is removed, it can be moved from the position shown in Fig. 4 to that shown in Fig. 6 by disengaging the clamp rods 13 from the clip 16 and then hooking the guide bracket 19 over the shoulder 18. In this position the pivotal axis of the end-gate will be formed by the pivotal connection between the clamp rods and the wagon body and the end-gate can be swung open any desired amount. The nut $15^1$ on the eye-bolt 15 enables the clamp block to be adjusted to and from the end-gate and enables the latter to be closed tightly against the rear end of the wagon body. The hooked collar 20 on the clamp rod 13 permits the end-gate to be lowered less than its full movement, while the cleat 21, which is fixed to the end-gate near the upper edge thereof, operates to strengthen same and forms a stronger fastening for the lower end of the guide bracket 19.

What I claim as my invention, and desire to secure by Letters Patent, is:

1. In a device of the class described, in combination, a wagon body, an end-gate hinge-connected to the rear end of the floor thereof, clamp rods pivotally connected to the rear ends of the sides of said wagon body, reversible clamp blocks in connection with said rods, the abutting surfaces on the two sides of said blocks being at different distances from the longitudinal axes of the clamp rods, and means fixed to said end-gate for detachably engaging the free ends of said rods.

2. In a device of the class described, in combination, a wagon body, an end-gate hinge-connected to the rear end of the floor thereof, clamp rods pivotally connected to the rear ends of the sides of said body, clamp blocks in connection with said rods, said blocks having shoulders formed thereon, recesses in the end-gate adapted to receive said shoulders and thereby securely lock the rear ends of the side boards to the end-gate, and means fixed to said end-gate for detachably engaging the free ends of the clamp rods.

3. In a device of the class described, in combination, a wagon body, an end-gate hinge-connected to the rear end thereof and movable about either of three separate pivotal axes, a transversely extending shaft forming the lower and principal one of said pivotal axes, clamp rods having a pivotal connection with the rear ends of the sides of said body, clamp blocks provided with shoulders in connection with said clamp rods, recesses in the end-gate adapted to engages said shoulders, the shoulders on the clamp blocks and the pivotal connections of the clamp rods with the wagon body forming the second and third pivotal axes of said end-gate, and means secured to the end-gate for detachably engaging the clamp rods, substantially as and for the purpose specified.

4. In a device of the class described, in combination, a wagon body, projecting lugs secured to the rear end of the floor thereof, a shaft engaging said lugs, said shaft being provided with a transversely bent end, an end-gate hinged upon said shaft, and a spring clip fixed on one end of the end-gate and arranged to releasably engage the bent end of said shaft and hold same in position, substantially as and for the purpose specified.

OLIVER B. REYNOLDS.

Witnesses:
W. B. LARSEN,
F. T. NORRIS.